United States Patent Office 3,350,235
Patented Oct. 31, 1967

3,350,235
DRY CELL BATTERY HAVING CARBONACEOUS MATERIAL DISPOSED BETWEEN THE LAYERS OF THE BATTERY MIX
Rodolfo Rodriguez Balaguer, Harbor Beach, Fort Lauderdale, Fla., assignor, by mesne assignments, to Patent Holdings Corporation, Fort Lauderdale, Fla., a corporation of Florida
Filed Mar. 11, 1965, Ser. No. 438,944
11 Claims. (Cl. 136—107)

The present invention relates to primary galvanic cells and more particularly to such cells of the so-called "dry" type.

The invention is principally concerned with primary batteries of the magnesium cell type, i.e., batteries having magnesium anodes, and especially with such batteries constructed generally in accordance with the structure described in United States Patent 2,903,499, issued Sept. 8, 1959, to Rodolfo Rodriguez Balaguer. Hence the invention will be described in connection with magnesium cells having such structure. However, it should be understood that the principles of the invention are applicable to dry cell batteries other than magnesium cells and to battery structures other than those of the type referred to in the aforementioned Rodriguez Balaguer patent. For example, the aforementioned Rodriguez Balaguer patent describes a battery construction with a carbon cup and a central carbon rod serving as the battery cathode. The principles of the present invention are fully applicable to batteries not having a central carbon rod and are in part applicable to the more conventional battery construction in which the metal anode forms the outside container for the battery.

Efforts to develop satisfactory magnesium cells have been hampered by a number of problems which, if not peculiar to this type of cell, are all at least especially troublesome with this cell. Among these problems have been a time delay in reaching working voltage when the battery is connected in a circuit, a serious loss of short circuit current capacity after a relatively short shelf storage, an increase in internal resistance with shelf storage and, in general, a poorer shelf life than is desirable or than is experienced with a comparable zinc cell.

The time delay problem appears to be caused, in part, by formation of a film along the metal anode which must be dissipated or punctured before working voltage is achieved. However, the time delay problem has another aspect which appears to be due to a loss of moisture from the battery mix (electrolyte and depolarizer mixture) and from the bibulous paper or other covering surrounding the anode. The loss of moisture which is encountered in magnesium cells appears to be due to two principal causes, evaporation and chemical reactions which occur during discharge.

As the battery mix loses moisture it tends to shrink, primarily in a radial direction, and contact between the mix and the inner surface of the outer container is wholly or partially lost. In a D-size magnesium cell of the type shown in the aforementioned Rodriguez Balaguer patent a clearance which sometimes is as high as 0.002" has been measured between the mix cylinder and the inner surface of the carbon cups after a relatively short shelf storage. With such a situation electrical contact between the mix and the cathode structure has effectively been restricted to the surface of the inner carbon rod and the cup base. It appears that this situation is at least largely responsible for the increase in cell internal resistance and decrease in short circuit current which have been observed.

When the magnesium anode starts to swell during discharge the battery mix may again be forced into contact with the cup wall provided the shrinkage of the mix has not progressed to a point where sufficient discharge is not possible to convert the magnesium metal into its oxide and provided the bibulous paper or covering on the anode is not too dry to permit adequate ion flow between the mix and the anode.

The principal object of the invention has been to provide a novel and improved dry cell battery construction.

More particularly it has been an object of the invention to provide such a construction which is especially adapted to improve the performance of magnesium cells.

Another object of this invention has been to provide a novel and improved dry cell battery construction which minimizes the loss of moisture due to evaporation.

A further object of this invention has been to provide a novel and improved dry cell battery construction which minimizes the increase in cell internal resistance which occurs as moisture is lost from the battery mix by chemical reaction during discharge.

Still another object of the invention has been the provision of a dry cell battery construction in which loss of moisture from the anode bibulous covering is minimized.

Other and further objects, features and advantages of the invention will appear more fully from the following description taken in connection with appended drawing in which.

Figure 1:
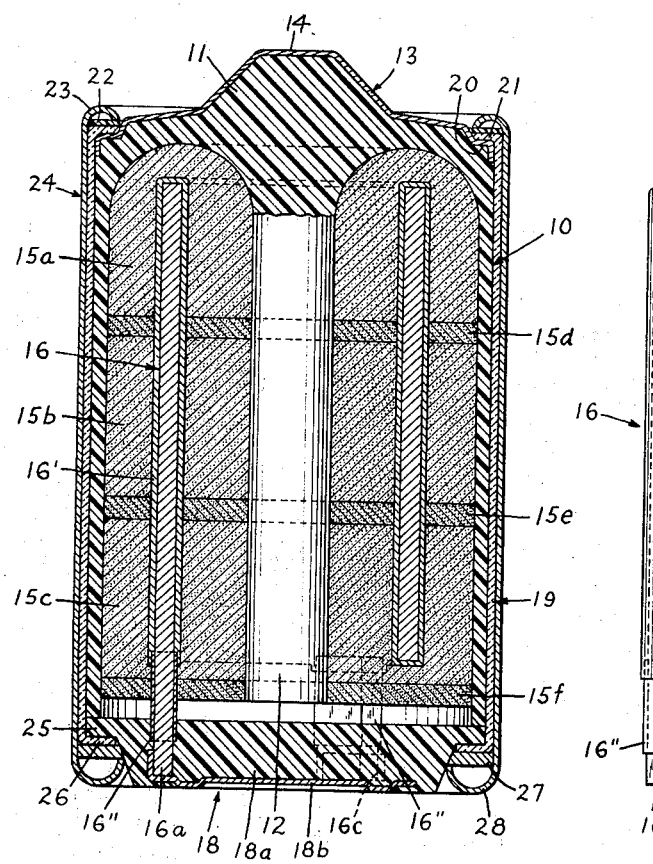
FIG. 1 is a longitudinal sectional view of a dry cell battery embodying the invention.
Figure 2:
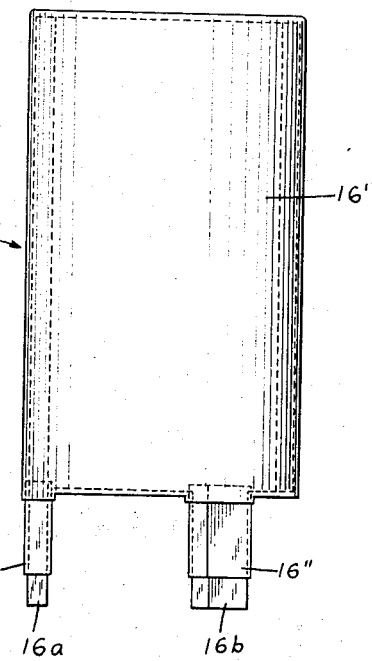
FIG. 2 is an elevational view, partly in cross section, of the anode cylinder of FIG. 1.
Figure 3:
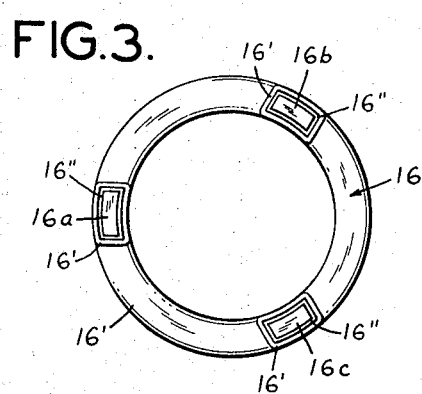
FIG. 3 is a bottom plan view of the anode cylinder of FIG. 2.

Referring now to the drawing, the dry cell battery illustrated in FIG. 1 is generally of the type shown in the aforementioned Rodriguez Balaguer patent. The battery has a cathode (current collecting electrode) structure comprising a cylindrical carbon cup 10, a closed end or base 11 and a central carbon rod projecting from base 11. The cup 10, base 11 and rod 12 may be integral, as shown, or the rod 12 may be made separately and be inserted in a corresponding aperture in base 11. A metal cap 13 having a contact forming boss 14 is provided over base 11.

The cup 10, base 11 and rod 12 may be formed of a molded green carbon, e.g., as described in the aforementioned Rodriguez Balaguer patent or as described in the copending United States patent application of Rodolfo Rodriguez Balaguer, Ser. No. 208,096, filed July 6, 1962, now Patent No. 3,196,025.

In making the battery the annular space between the cup 10 and the central rod 12 is filled with battery mix. In accordance with one aspect of the invention, the battery mix is inserted in discrete layers separated by thin layers of an electrically conductive, carbonaceous material in particle form. In the embodiment illustrated in the drawing the battery mix is divided into three layers designated, respectively, 15a, 15b and 15c. The layers 15a and 15b are seperated by a carbonaceous layer 15d, while the layers 15b and 15c are separated by a carbonaceous layer 15e. A third carbonaceous layer 15f is provided as a sealing layer on the opposite surface of mix layer 15c.

Typically a D-size cell might have 45 grams of battery mix and this quantity of mix might be divided equally between layers 15a, 15b and 15c so that each would contain 15 grams. The layers 15d, 15e and 15f are relatively thin and might each comprise, for a D-size cell 2 grams of carbonaceous material in a layer about $\frac{1}{16}''$ thick. The thickness of the layers 15d, 15e and 15f should be selected to afford a sealing effect substantially to prevent the transmission of moisture out of the respective mix layers. In this regard it will be observed that some dislocation of the layers will result when the anode cylinder is inserted in the cell, so the carbonaceous material layers should be sufficiently thick as to afford the seal effect despite this dislocation.

It is desirable that each layer be formed individually and then be tamped under a suitable pressure, e.g., 45 p.s.i. Thus the layer 15a might be inserted in the cup and be tamped, followed successively by the layers 15d, 15b, 15e, 15c and 15f, with tamping after each filling step. It will be evident, of course, that the various layers may be formed outside of the cup into a suitable dolly form which is inserted as a unit in the battery cup.

The electrically conductive carbonaceous particles forming the layers 15d, 15e and 15f should be water repellent to provide the desired moisture sealing action. A particularly desirable material for this purpose is natural lubricating flake graphite, preferably in relatively small particle sizes, e.g., to pass a 325 mesh screen. Flake graphite has been found superior to amorphous graphite.

The layers 15d, 15e and 15f need to be electrically conductive since they serve to carry current from the battery mix layer to the carbon cathode structure when the mix layers shrink radially and wholly or partially lose contact with the cup walls.

The electrical conductivity function of the graphite can be preserved and the moisture sealing characteristic can be enhanced by mixture of a small quantity of a binder such as wax, e.g., of the candle wax type, with the graphite. It has been found that up to 10% by weight of the wax can be used for this purpose with natural lubricating flake graphite, although it has been found preferable to hold this wax content to about 5%.

The battery mix (principally electrolyte and depolarizer) forming the layers 15a, 15b and 15c may be of any desired type suitable for use with a magnesium anode.

When the layers 15 are in place in the battery cup, a hollow cylindrical metal anode 16 is inserted through the various layers with one end being adjacent but spaced from base 11 and the other end being located slightly inwardly of the outer end of the layer 15c except for legs 16a, 16b and 16c which project beyond the open end of the cup 10 to a bottom closure 18. The bottom closure 18 comprises a plastic disk 18a and an outer metal contact disk 18b. Formation of the bottom closure 18 is preferably accomplished as described in the copending United States patent application of Rodolfo Rodriguez Balaguer, Ser. No. 357,190, filed Apr. 3, 1964, now abandoned.

The anode 16 is provided with a suitable bibulous covering or coating 16' on both sides to prevent direct contact between the anode and the battery mix. A moistened kraft paper has been found suitable for this purpose. The bibulous covering 16' extends around the base of the anode cylinder and partially along the legs 16a, 16b and 16c which project from the base. An electrically insulating layer 16" underlies the covering 16' on the legs 16a, 16b and 16c, and extends downwardly into the plastic disk 18a. Preferably the layer 16" is a plastic pressure sensitive adhesive tape which will adhere to the metal legs and will bond to the disk 18a when the latter is formed.

It will be observed that the axial end of the main body of the anode cylinder 16 is located axially inwardly of the outer end of mix layer 15c and that the bibulous covering 16' does not extend into the carbonaceous layer 15f. Hence the layer 15f effectively seals off the bibulous covering 16' and substantially prevents evaporation of moisture therefrom. The evaporation of moisture from bibulous covering 16' has been a severe problem since the covering carries moisture in an axial direction by capillary action and hence the loss of moisture is greater than would occur merely from the bibulous covering being exposed beyond the battery mix.

Superior performance and shelf life characteristics obtained from batteries embodying the invention are demonstrated by the table below in which the odd numbered cells represent D-size magnesium batteries constructed as shown in FIG. 1 while the even numbered cells represent essentially identical batteries without the graphite layers and having the bibulous covering communicating directly with the space below the mix. For the odd numbered cells approximately 45 grams of battery mix was used, while for the even numbered cells approximately 50 grams of battery mix was used. All cells had 0.055" thick magnesium anodes with kraft paper bibulous covering moistened on both sides with a 5% Methocel solution. The closed circuit voltage was measured with a load of four ohms. The storage was effected at an elevated temperature (130° F.) to obtain an accelerated shelf life test.

| Cell No. | Open Circuit Voltage (volts) | Closed Circuit Voltage (volts) | Short Circuit Current (amps) | Storage Time |
|---|---|---|---|---|
| 1 | 1.93 | 1.85 | 17 | Fresh. |
| 2 | 1.93 | 1.84 | 12 | Do. |
| 3 | 1.93 | 1.85 | 17 | Do. |
| 4 | 1.93 | 1.84 | 10 | Do. |
| 5 | 1.94 | 1.65 | 17 | 3 days. |
| 6 | 1.94 | 1.62 | 12 | Do. |
| 7 | 1.94 | 1.58 | 17 | Do. |
| 8 | 1.94 | 1.35 | 9 | Do. |
| 9 | 1.92 | 1.28 | 12 | 7 days. |
| 10 | 1.92 | 1.12 | 9 | Do. |
| 11 | 1.92 | 1.65 | 12 | 10 days. |
| 12 | 1.92 | 1.20 | 9 | Do. |

Referring again to FIG. 1, the battery is provided with an electrically insulating jacket 19 surrounding cup 10 and having the upper end thereof crimped or folded over onto an annular shoulder 20 of cup 13 as shown at 21. An annular electrically insulating washer 22 overlies the folded-over portion 21 and separates the same from a crimped end 23 of an outer jacket 24.

The jacket 19 is preferably made from a strong adhesively coated paper tape, e.g., a strong masking tape, or from a fiberglass reinforced adhesive tape as described in Rodolfo Rodriguez Balaguer United States patent application Ser. No. 312,049, filed Sept. 27, 1963, now Patent No. 3,214,299. The washer 17 may be made of paper or other suitable material. The outer jacket 24 is preferably made of a thin steel, e.g., 0.008–0.010" thick.

At the bottom end of the battery the jacket 19 is similarly folded or crimped over an annular shoulder 25 of closure element 18, as shown at 26. A cardboard or other suitable electrically insulating annular washer 27 contacts folded over portion 26 of jacket 19 and is held thereagainst by crimped end 28 of outer jacket 24.

While the invention has been described in connection with a specific embodiment thereof and in a specific use, various modifications thereof will occur to those skilled in the art without departing from the spirit and scope of the invention as set forth in the appended claims.

What is claimed is:

1. A dry cell battery, comprising a carbon cup forming a cathode element and having a hollow body, a closed end and an open end; a metallic anode disposed within said body of said cup; a bibulous covering on said anode; a quantity of battery mix in said cup disposed in a plurality of discrete axially spaced layers each arranged to contact said body and said bibulous covering; a quantity of electrically conductive, water-repellent, carbonaceous material in comminuted form disposed between said layers and contacting said layers, said body and said bibulous covering to provide electrical contact between said layers and said cathode and to provide an effective moisture sealing barrier between said layers; and closure means for said open end of said cup.

2. A dry cell battery, comprising a carbon cup forming a cathode element and having a hollow body, a closed end and an open end; a metallic anode disposed within said body of said cup; a bibulous covering on said anode; a quantity of battery mix in said cup disposed in a plurality of discrete axially spaced layers each arranged to contact said body and said bibulous covering; a plurality of thin layers of electrically conductive, water-repellent, carbonaceous material in comminuted form, one of said thin carbonaceous layers being disposed between each of said layers of battery mix and one of said thin carbonaceous layers being disposed in contact with the layer of battery mix nearest said open end and between said last mentioned layer and said open end, said carbonaceous layers being in electrical and moisture sealing contact with the adjacent layer of battery mix, said body and said bibulous covering to provide electrical contact between said layers of battery mix and said cathode and substantially to prevent transfer of moisture axially in said battery from one layer of battery mix to another and from said battery mix to said open end of said cup; and closure means for said open end of said cup.

3. A dry cell battery as set forth in claim 2 in which said anode is made substantially from magnesium metal.

4. A dry cell battery as set forth in claim 2 in which said carbonaceous material is graphite.

5. A dry cell battery as set forth in claim 4 in which said carbonaceous material is natural lubricating flake graphite.

6. A dry cell battery as set forth in claim 4 in which a quantity of wax is mixed with said graphite in a proportion of less than about 10% by weight of wax to graphite.

7. A dry cell battery as set forth in claim 2 in which said bibulous covering adjacent the end of said anode facing said open end of said cup terminates axially inwardly of the corresponding boundary of said battery mix thereby to remain out of contact with any moisture receiving space in said battery.

8. A dry cell battery as set forth in claim 7 in which electrically connecting means contacts said anode and extends through said closure means to afford an external electrical contact, non-bibulous means being provided to protect said connecting means from contact with said battery mix.

9. A dry cell battery, comprising a carbon cup forming a first cathode element and having a hollow cylindrical body, a closed end and an open end; a carbon rod projecting from said closed end of said cup and disposed generally along the longitudinal axis of said cup and being electrically connected thereto, said carbon rod forming a second cathode element; an annular metallic anode disposed between said rod and said body of said cup and being substantially concentric therewith; battery mix disposed between said anode and said cathode elements; a bibulous material carried on said anode and preventing direct contact between said anode and said mix; an outer jacket member surrounding said hollow body; closure means for said open end of said cup; said battery mix being formed in at least three discrete axially spaced layers; and at least three discrete layers of an electrically conductive, water-repellent, carbonaceous material in comminuted form, one of said carbonaceous layers being disposed between each of said layers of mix and one of said carbonaceous layers being disposed in contact with the mix layer nearest said open end and between said last mentioned layer and said open end, said carbonaceous layers being in electrical and moisture sealing contact with said layers of mix, said bibulous material and said body to provide electrical connection between said mix layers and said cathode and to prevent substantial axial moisture transfer from said respective layers of mix.

10. A dry cell battery, comprising a carbon cup forming a first cathode element and having a hollow cylindrical body, a closed end and an open end; a carbon rod projecting from said closed end of said cup and disposed generally along the longitudinal axis of said cup and being electrically connected thereto, said carbon rod forming a second cathode element; an annular metallic anode disposed between said rod and said body of said cup and being substantially concentric therewith; battery mix disposed between said anode and said cathode elements; a bibulous material carried on said anode and preventing direct contact between said anode and said mix; an outer jacket member surrounding said hollow body; closure means for said open end of said cup, said closure means comprising an electrically insulating, corrosion resistant solid plastic disk having a diameter at least equal to the diameter of said open end of said hollow body and arranged to close said open end, an electrically conductive metallic disk mounted on an external surface of said plastic disk so as to be completely out of contact with battery mix in said hollow body, and metallic means extending through the thickness of said plastic disk and into contact with said anode to provide electrical contact between said metallic disk and said anode, said last mentioned means acting also to retain said metallic disk on said external surface; means including an end of said outer jacket member to retain said plastic disk in closure relationship with said open end of said hollow body; said battery mix being formed in at least three discrete axially spaced layers; and at least three thin discrete layers of an electrically conductive, water-repellent, carbonaceous material in comminuted form, one of said carbonaceous layers being disposed between each of said layers of mix and one of said carbonaceous layers being disposed in contact with the mix layer nearest said open end and between said last mentioned layer and said open end, said carbonaceous layers being in electrical and moisture sealing contact with said layers of mix, said bibulous material and said body to provide electrical connection between said mix layers and said cathode and to prevent substantial axial moisture transfer from said respective layers of mix.

11. A dry cell battery, comprising a carbon cup forming a first cathode element and having a hollow cylindrical body, a closed end and an open end; a carbon rod projecting from said closed end of said cup and disposed generally along the longitudinal axis of said cup and being electrically connected thereto, said carbon rod forming a second cathode element; an annular metallic anode disposed between said rod and said body of said cup and being substantially concentric therewith; battery mix disposed between said anode and said cathode elements; a bibulous material carried on said anode and preventing direct contact between said anode and said mix, the axial end of said anode facing said open end being located axially inwardly of the axial end of said battery mix whereby said bibulous material is not exposed to any moisture receiving space; an outer jacket member surrounding said hollow body; closure means for said open end of said cup, said closure means comprising an electrically insulating, corrosion resistant solid plastic disk having a diameter at least equal to the diameter of said open end of said hollow body and arranged to close said open end, an electrically conductive metallic disk mounted on an external surface of said plastic disk so as to be completely out of contact with battery mix in said hollow body, metallic means extending through the thickness of said plastic disk and into contact with said anode to provide electrical contact between said metallic disk and said anode, said last mentioned means acting also to retain said metallic disk on said external surface, and a non-bibulous covering on all portions of said metallic means exposed to contact with said battery mix to protect said metallic means from corrosion; means including an end of said outer jacket member to retain said plastic disk in closure relationship with said open end of said hollow body; said battery mix being formed in at least three discrete axially spaced layers; and at least three thin discrete layers of an electrically conductive, water-repellent, carbonaceous material in comminuted form, one of said carbonaceous layers being disposed between each of said layers of mix and one of said carbonaceous layers being disposed in contact with the mix layer nearest said open end and between said last mentioned layer and said open end, said carbonaceous layers being in electrical and moisture sealing contact with said layers of mix, said bibulous material and said body to provide electrical connection between said mix layers and said cathode and to prevent substantial axial moisture transfer from said respective layers of mix.

References Cited

UNITED STATES PATENTS

| | | | |
|---|---|---|---|
| 2,903,499 | 9/1959 | Balaguer | 136—107 |
| 3,116,172 | 12/1963 | Wilke et al. | 136—107 |
| 3,272,655 | 9/1966 | Balaguer | 136—100 |

WINSTON A. DOUGLAS, *Primary Examiner.*

A. SKAPARS, *Assistant Examiner.*